(12) United States Patent
Huang

(10) Patent No.: US 12,141,187 B2
(45) Date of Patent: Nov. 12, 2024

(54) FILE MANAGING METHOD FOR A DIGITAL APPARATUS

(71) Applicant: Intellectual Ventures I LLC, Wilmington, DE (US)

(72) Inventor: Chih-Wen Huang, Taipei (TW)

(73) Assignee: Intellectual Ventures I LLC, Wilmington, DE (US)

( * ) Notice: Subject to any disclaimer, the term of this patent is extended or adjusted under 35 U.S.C. 154(b) by 1511 days.

(21) Appl. No.: 16/403,166

(22) Filed: May 3, 2019

(65) Prior Publication Data

US 2019/0370276 A1 Dec. 5, 2019

Related U.S. Application Data

(63) Continuation of application No. 15/269,803, filed on Sep. 19, 2016, now abandoned, which is a
(Continued)

(30) Foreign Application Priority Data

Aug. 20, 2003 (TW) .................................. 092122825

(51) Int. Cl.
*G06F 16/41* (2019.01)
*G06F 16/16* (2019.01)
*G06F 16/51* (2019.01)
*G11B 27/32* (2006.01)
*H04N 1/21* (2006.01)
*H04N 5/77* (2006.01)
(Continued)

(52) U.S. Cl.
CPC .............. *G06F 16/41* (2019.01); *G06F 16/16* (2019.01); *G06F 16/51* (2019.01); *G11B 27/329* (2013.01); *H04N 1/2158* (2013.01); *H04N 1/2166* (2013.01); *H04N 5/77* (2013.01); *H04N 5/772* (2013.01); *H04N 5/765* (2013.01); *H04N 5/781* (2013.01); *H04N 5/85* (2013.01); *H04N 5/907* (2013.01); *H04N 9/7921* (2013.01); *H04N 9/8042* (2013.01); *H04N 9/8047* (2013.01); *H04N 2101/00* (2013.01); *H04N 2201/0084* (2013.01)

(58) Field of Classification Search
CPC ........................................................ G06F 16/41
USPC ........................................................ 707/809
See application file for complete search history.

(56) References Cited

U.S. PATENT DOCUMENTS 9,451,120 B2 9/2016 Huang et al.
2002/0093582 A1 7/2002 Aoki et al.
(Continued)

FOREIGN PATENT DOCUMENTS

EP 1324586 7/2003
JP 2003-209725 7/2003

OTHER PUBLICATIONS

United States Patent and Trademark Office, Final Office Action, U.S. Appl. No. 14/141,234, mailed Feb. 17, 2016, 31 pages.
(Continued)

*Primary Examiner* — Syling Yen
(74) *Attorney, Agent, or Firm* — Perkins Coie LLP

(57) ABSTRACT

A file managing method for a digital apparatus includes (a) establishing a folder corresponding to a file type generated in an operational mode of the digital apparatus, and (b) storing a file according to its file type to the folder corresponding to the file type established in step (a).

20 Claims, 11 Drawing Sheets

Related U.S. Application Data continuation of application No. 14/141,234, filed on Dec. 26, 2013, now Pat. No. 9,451,120, which is a continuation of application No. 10/605,950, filed on Nov. 9, 2003, now abandoned.

(51) Int. Cl.

| | | |
|---|---|---|
| H04N 5/765 | (2006.01) | |
| H04N 5/781 | (2006.01) | |
| H04N 5/85 | (2006.01) | |
| H04N 5/907 | (2006.01) | |
| H04N 9/79 | (2006.01) | |
| H04N 9/804 | (2006.01) | |
| H04N 101/00 | (2006.01) | |

(56) References Cited

U.S. PATENT DOCUMENTS

| | | | |
|---|---|---|---|
| 2002/0118949 A1 | 8/2002 | Jones et al. | |
| 2003/0011683 A1* | 1/2003 | Yamasaki | H04N 1/32101 386/E5.072 |
| 2003/0110503 A1 | 6/2003 | Perkes | |
| 2004/0098379 A1* | 5/2004 | Huang | G06F 16/5838 |
| 2005/0044084 A1 | 2/2005 | Huang | |
| 2017/0147567 A1 | 5/2017 | Huang | |

OTHER PUBLICATIONS

United States Patent and Trademark Office, Final Office Action, U.S. Appl. No. 15/269,803, mailed Jan. 4, 2019, 15 pages.
United States Patent and Trademark Office, Non-Final Office Action, U.S. Appl. No. 14/141,234, mailed Sep. 22, 2015, 21 pages.
United States Patent and Trademark Office, Non-Final Office Action, U.S. Appl. No. 15/269,803, mailed Sep. 13, 2018, 14 pages.
United States Patent and Trademark Office, Notice of Allowance, U.S. Appl. No. 14/141,234, mailed May 18, 2016, 6 pages.
"Natural Chinese Input Manual," 2003, www.iqchina.com, 3 pages.
Dr.eye2002 iDictionary, "Installation and start," 2002, 3 pages.
Sobell, Mark G., "Unix System V: A Practical Guide," 3rd edition. The Benjamin/Cummings Publishing Company, Inc., 1995, pp. 67-77.
United States Patent and Trademark Office, Examiner's Answer to Appeal Brief, U.S. Appl. No. 10/605,950, mailed Sep. 27, 2010, 28 pages.
United States Patent and Trademark Office, Final Office Action, U.S. Appl. No. 10/605,950, mailed Aug. 10, 2009, 26 pages.
United States Patent and Trademark Office, Final Office Action, U.S. Appl. No. 10/605,950, mailed Aug. 11, 2006, 20 pages.
United States Patent and Trademark Office, Non-Final Office Action, U.S. Appl. No. 10/605,950, mailed Mar. 29, 2006, 20 pages.
United States Patent and Trademark Office, Non-Final Office Action, U.S. Appl. No. 10/605,950, mailed Nov. 13, 2007, 24 pages.
United States Patent and Trademark Office, Patent Board Decision, U.S. Appl. No. 10/605,950, mailed Oct. 25, 2013, 5 pages.

* cited by examiner

Fig. 3 Prior Art

FILE MANAGING METHOD FOR A DIGITAL APPARATUS

CROSS-REFERENCE TO RELATED APPLICATIONS

This application is a continuation of Ser. No. 15/269,803, filed Sep. 19, 2016, which is a continuation of U.S. patent application Ser. No. 14/141,234, filed Dec. 26, 2013, (U.S. Pat. No. 9,451,120), which is a continuation of U.S. patent application Ser. No. 10/605,950, filed Nov. 9, 2003, which claims priority to TW Patent Application No. 092122825, filed Aug. 20, 2003, all of which are hereby incorporated by reference in their entireties.

BACKGROUND OF INVENTION

1. Field of the Invention

The present invention relates to a file managing method for a digital apparatus, and more specifically, to a file managing method which establishes folders according to different file types in different operational modes and store files according to the file type into the different folders.

2. Description of the Prior Art

As the information industry progresses, information-related products such as digital cameras and digital camcorders are increasingly used in daily life and conventional analog products are gradually being replaced by digital products. Take the digital camera as an example. Conventional film cameras utilize chemicals on a film to record images, which can be viewed after development. However, if a user wants to take pictures with special effects, the user is required to be skillful in controlling the stop, the shutter, as well as the lens and film development. These steps are difficult for an amateur. In contrast to conventional film cameras, digital cameras convert images into digital signals using a photosensor to directly store the image in a memory device. Digital cameras can also be connected to a computer system and store the images on the computer systems hard disk drive. The images can then be viewed on the screen or printed on a printer. In addition, the user can further process the images recorded by the digital camera using image processing software to produce special effects, which previously, with a conventional optical camera, could only be realized by a professional photographer. In some cases, the digital special effects could not be achieved using a conventional optical camera.

Please refer to FIG. 1 showing a front view of a conventional digital camera 10. The digital camera 10 includes a lens 12 for capturing an object, an optical viewfinder 14 for viewing the object, and a shutter button 16 for focusing and shooting. Please refer to FIG. 2 showing a rear view of the conventional digital camera 10. The digital camera 10 further includes an electrical viewfinder 18 providing another option for viewing the object, which could be a liquid crystal display (LCD) or a low temperature polysilicon (LTPS) display, and a control button set 20 for image editing, browsing, and parameter settings. The difference between the conventional digital camera 10 and a conventional film camera is that the digital camera 10 provides the electrical viewfinder 18 for viewing the object or images captured instead of the optical viewfinder 14 which is smaller in size. Additionally, the user can browse or delete images stored in the digital camera using the electrical viewfinder 18.

Although digital cameras are becoming more popular every day, it is inconvenient to manage the captured images. This is especially true for up-to-date digital cameras that support various operational modes such as: still image capturing for image files (e.g. JPG, GIF, BMP etc.), motion picture capturing for motion picture files (e.g. AVI, MPG etc.), and recording for audio files (e.g. WAV, MP3 etc.). The present file managing method of the digital camera 10 is to automatically give each image a file name every time the digital camera 10 captures an image. The file name is a sequential number instead of a name given by the user, and different types of files will be saved in the same folder, such as DCIM folder according to the industry standard. Even if a folder having another name exists, the digital camera 10 cannot open it. Please refer to FIG. 3 showing the captured images shown by the electrical viewfinder 18 of the conventional digital camera 10 in FIG. 2. The digital camera 10 has stored image files (DC001-DC003), motion picture files (DC004-DC006) and audio files (DC007-DC009) all stored in the same folder. In other words, the image files are unarranged and difficult to search. Whenever the user wants to find a specific type of file, the files must be searched one by one using the control button set 20, which causes time to be wasted.

Moreover, as compact information products such as digital cameras, digital camcorders, mobile phones, personal digital assistants (PDA), and mp3 players become popular; data exchange between different types of apparatuses becomes necessary and must be improved. However, the file managing systems of different apparatuses are not always the same, preventing data exchange.

SUMMARY OF INVENTION

It is therefore a primary objective of the present invention to provide a file managing method for a digital apparatus in order to solve the problems mentioned above.

Briefly summarized, a file managing method for a digital apparatus includes (a) establishing a folder corresponding to a file type generated in an operational mode of the digital apparatus, and (b) storing a file according to its file type to the folder corresponding to the file type established in step (a).

The present invention also discloses a digital apparatus with a plurality of operational modes. The digital apparatus includes a receiving module for capturing a file, a control module for switching the operational mode of the digital apparatus, a folder establishing module for establishing a folder corresponding to a file type generated in a specific operational mode of the digital apparatus, and a memory module for storing the file captured by the receiving module according to its file type to the folder corresponding to the file type established by the folder establishing module.

These and other objectives of the present invention will no doubt become obvious to those of ordinary skill in the art after reading the following detailed description of the preferred embodiment that is illustrated in the various figures and drawings.

BRIEF DESCRIPTION OF DRAWINGS

Figure 3:
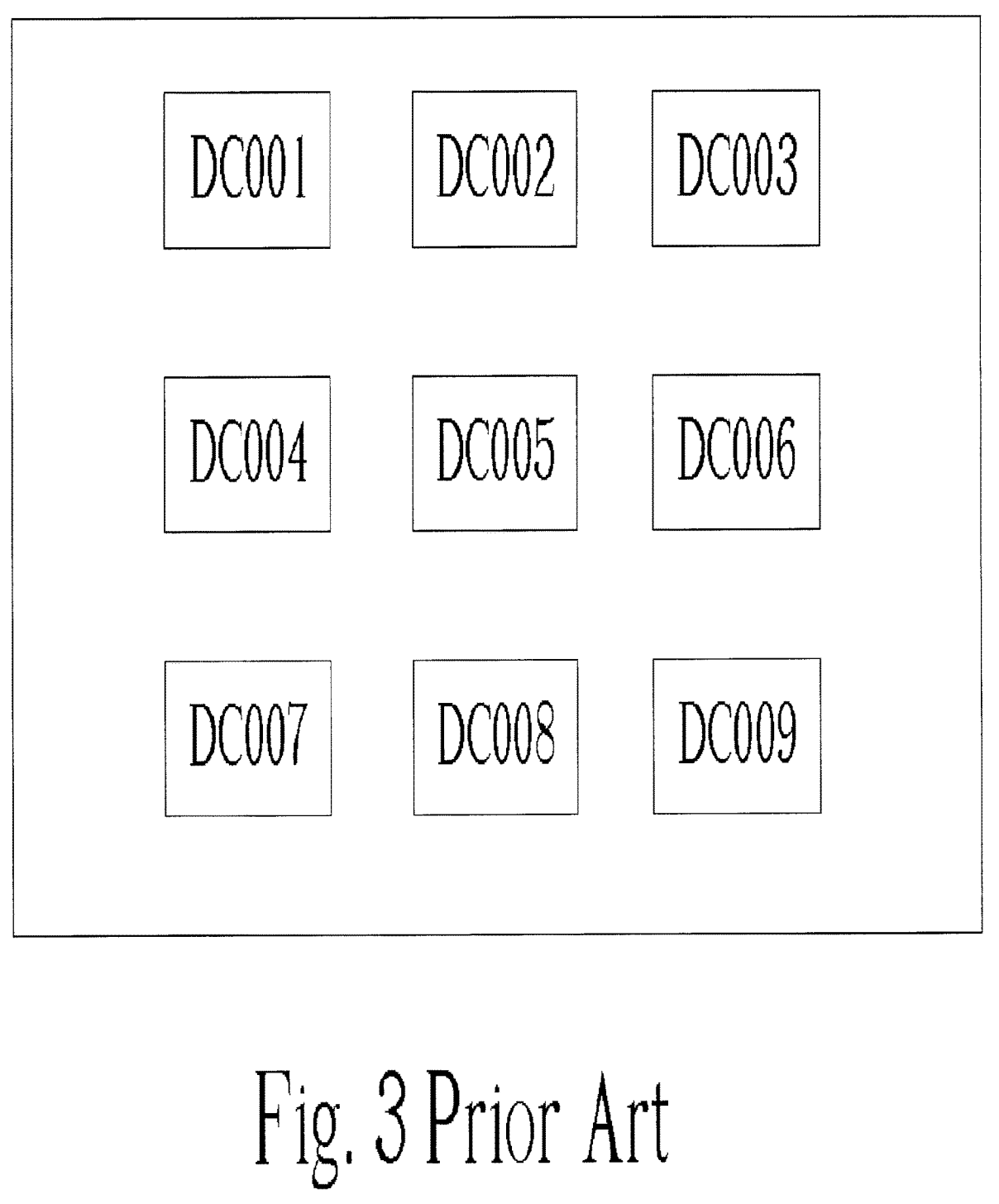

FIG. 3 illustrates the captured images shown by the electrical viewfinder of the conventional digital camera in FIG. 2.

DETAILED DESCRIPTION

Figure 1:
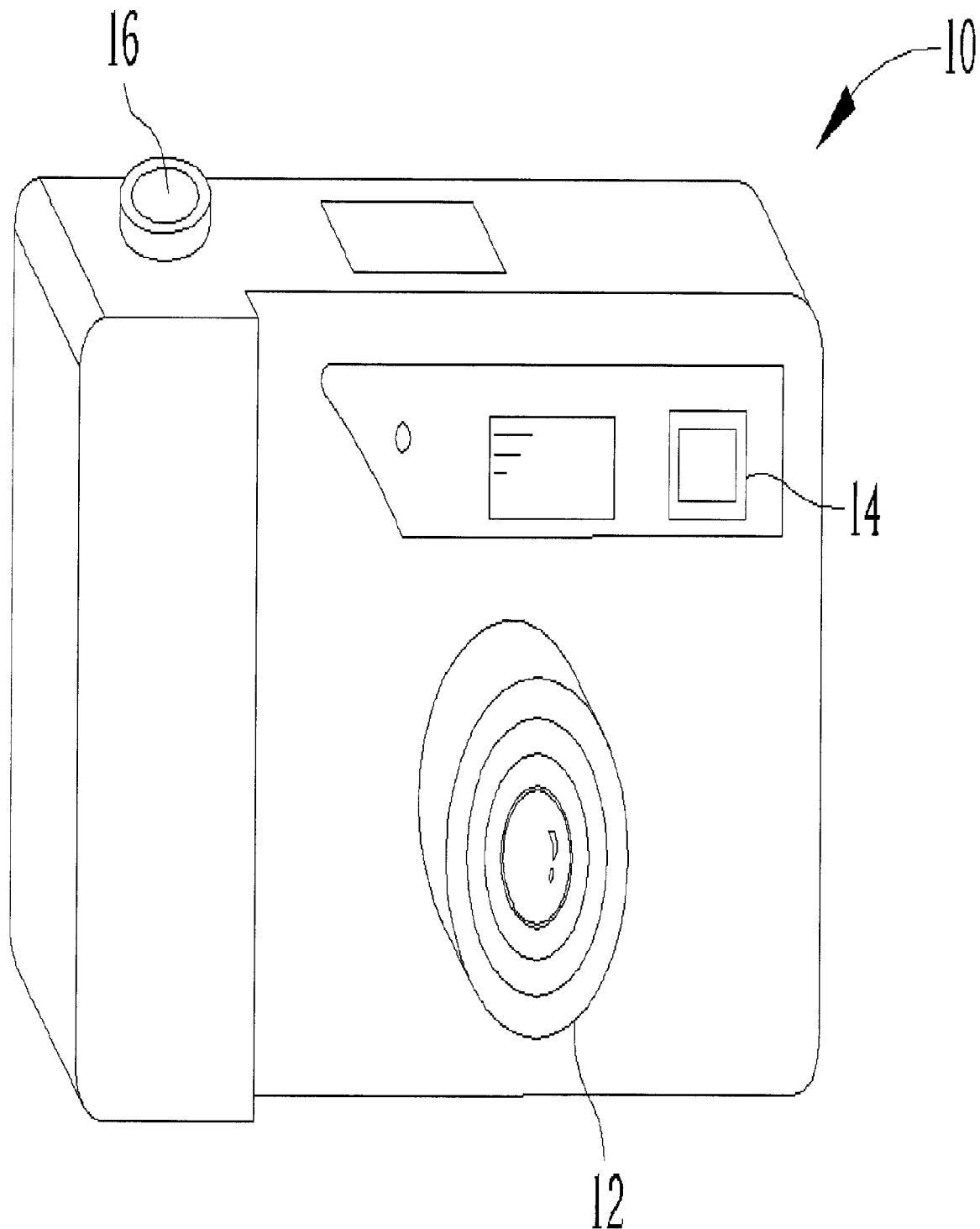
FIG. 1 is a front view of a conventional digital camera.
Figure 2:
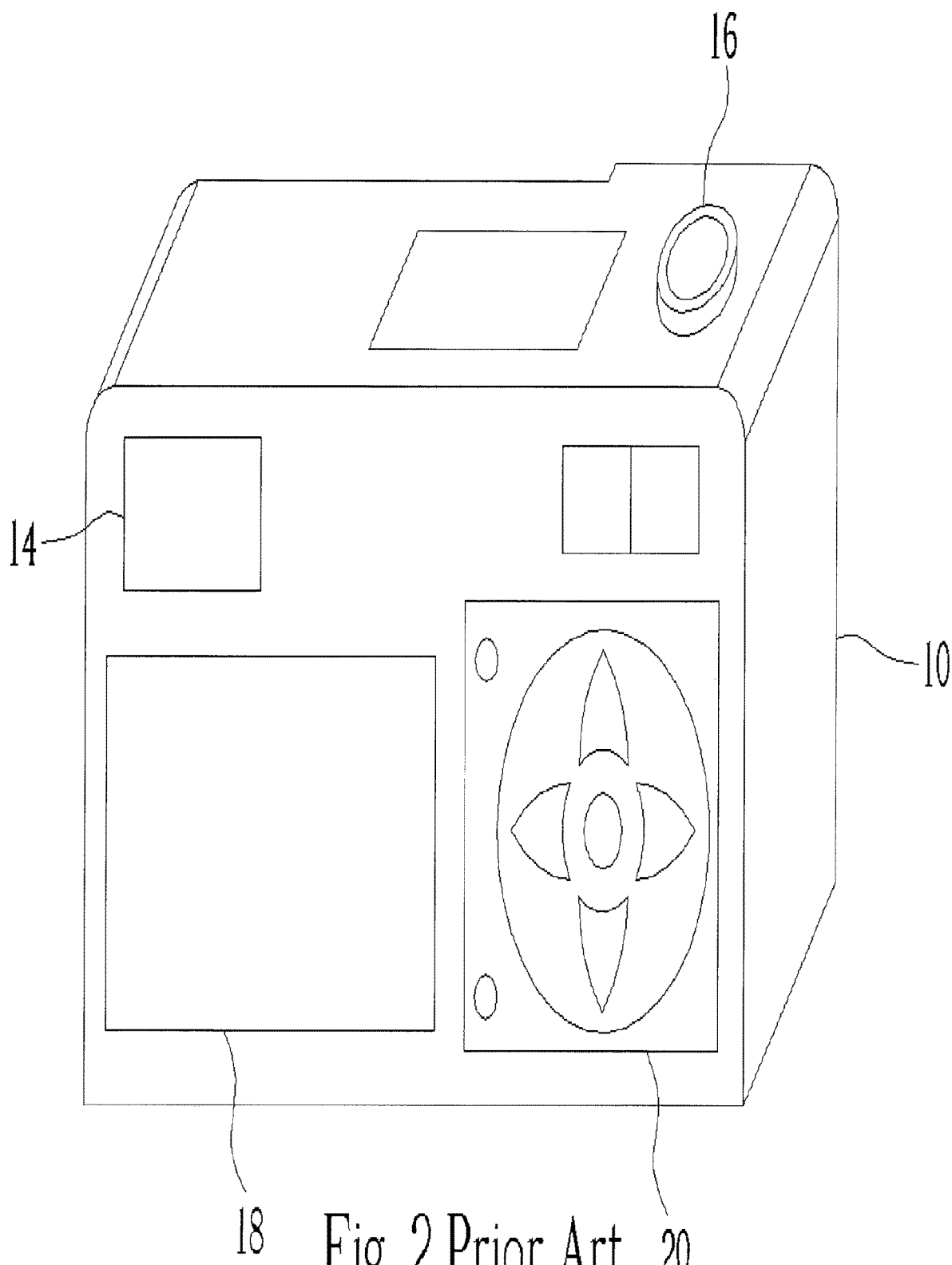
FIG. 2 is a rear view of the conventional digital camera.
Figure 4:
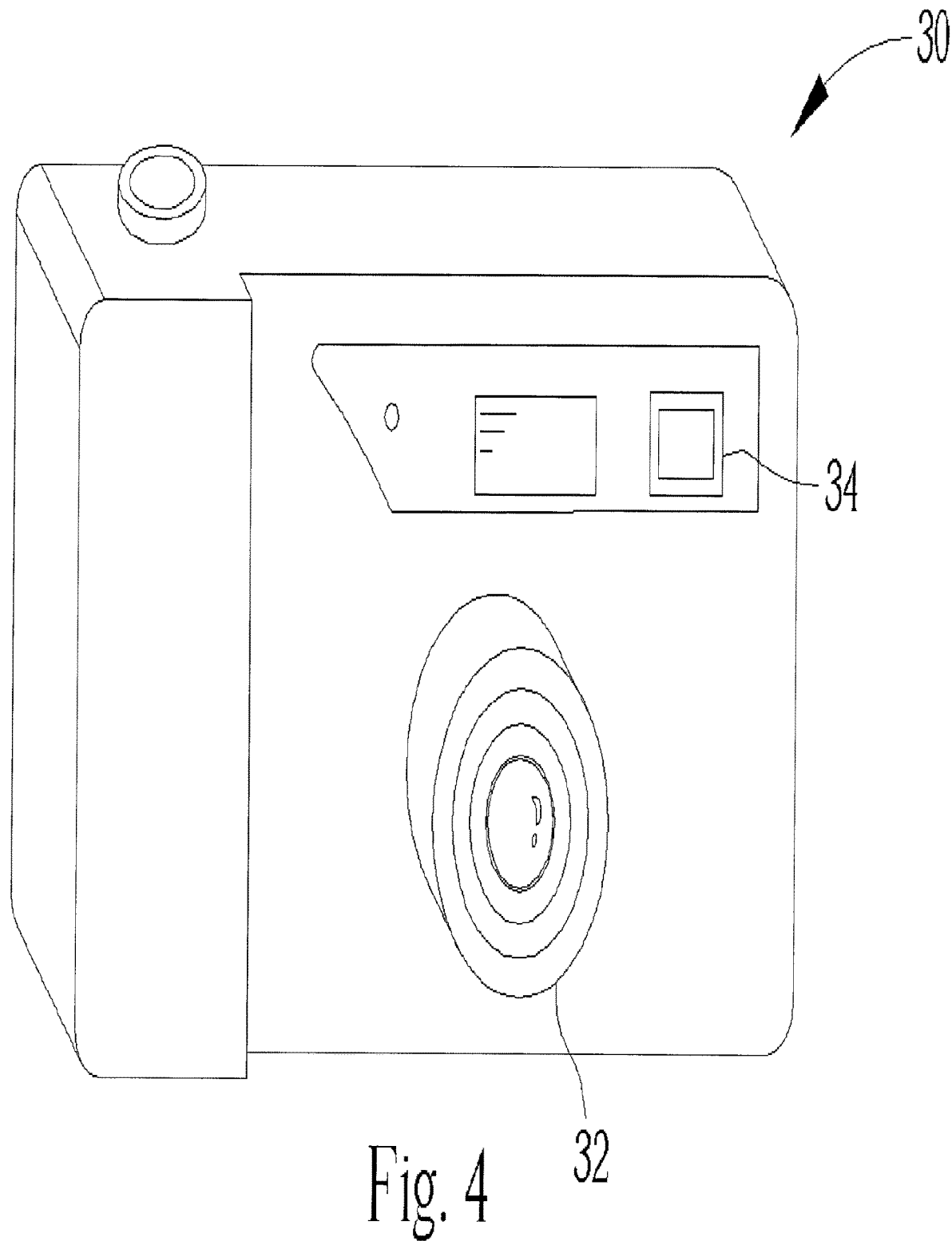
FIG. 4 is a front view of an image capturing apparatus according to the present invention.
Figure 5:
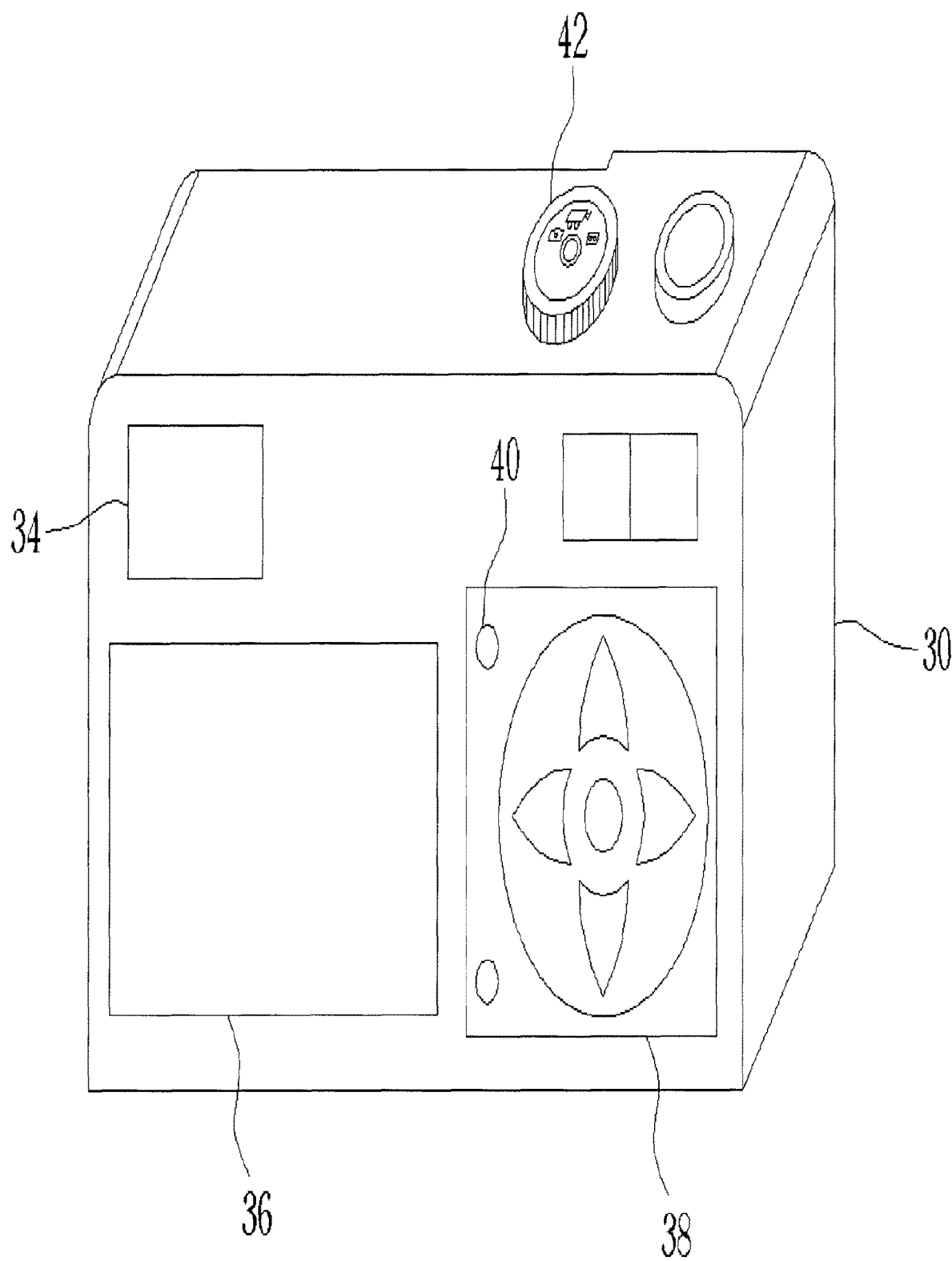
FIG. 5 is a rear view of an image capturing apparatus according to the present invention.

Please refer to FIG. 4 showing a front view of an image capturing apparatus 30 according to the present invention, and to FIG. 5 showing a rear view of the image capturing apparatus 30. The image capturing apparatus 30 can be a digital camera or a digital camcorder. The image capturing apparatus 30 includes a lens 32 for capturing an image, an optical viewfinder 34 for viewing the object, an electrical viewfinder 36which can be an LCD or an LTPS display for providing another option for viewing the object, and a control button set 38 for image editing, browsing, and parameter settings. The control button set 38 has a hot key 40 for browsing images stored in a folder for a specific file type or transmitting the images stored in the folder for the specific file type to other digital apparatuses when pressed. The image capturing apparatus 30 further includes an operational mode button 42 for selecting the operation mode.

Figure 6:
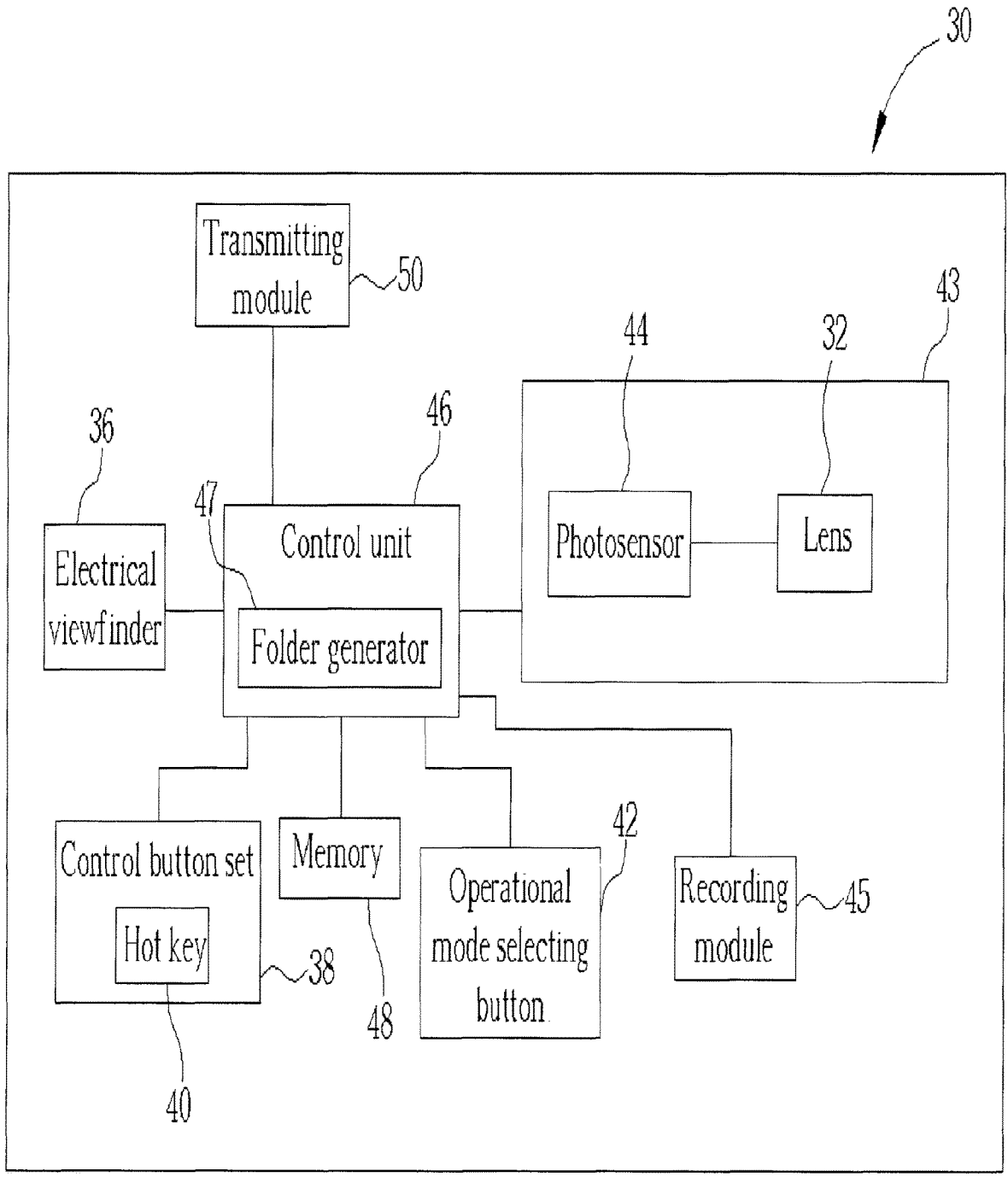
FIG. 6 is a block diagram of the image capturing apparatus according to the present invention.

Please refer to FIG. 6 showing a block diagram of the image capturing apparatus 30. The image capturing apparatus 30 further includes an image capturing module 43 comprising a lens 32 and a photosensor 44 for converting optical signals received by the lens 32 into electrical signals. The photosensor 44 can be a plurality of charge coupled devices (CCD) or a plurality of complementary metal-oxide semiconductor(CMOS) devices with the numbers of devices being directly proportional to the resolution of image. The image capturing apparatus 30 further includes a recording module 45 for receiving audio signals, a control unit 46 for processing the image signals from the photosensor 44 and the audio signals from the recording module 45 as well as for controlling the operation of the image capturing apparatus 30. Additionally, the control unit 46 includes a folder-establishing module 47 for generating folders according to different file types under different operational modes. The image capturing apparatus 30 further includes a memory 48 for storing image files, motion picture files, and audio files. The memory 48 can be a flash memory such as CF or SD card, a read-only memory such as an optical disk or a microdrive. A transmitting module 50 is included to transmit data using the USB or IEEE1394 wired protocols or else wirelessly through infrared or bluetooth™.

Figure 7:
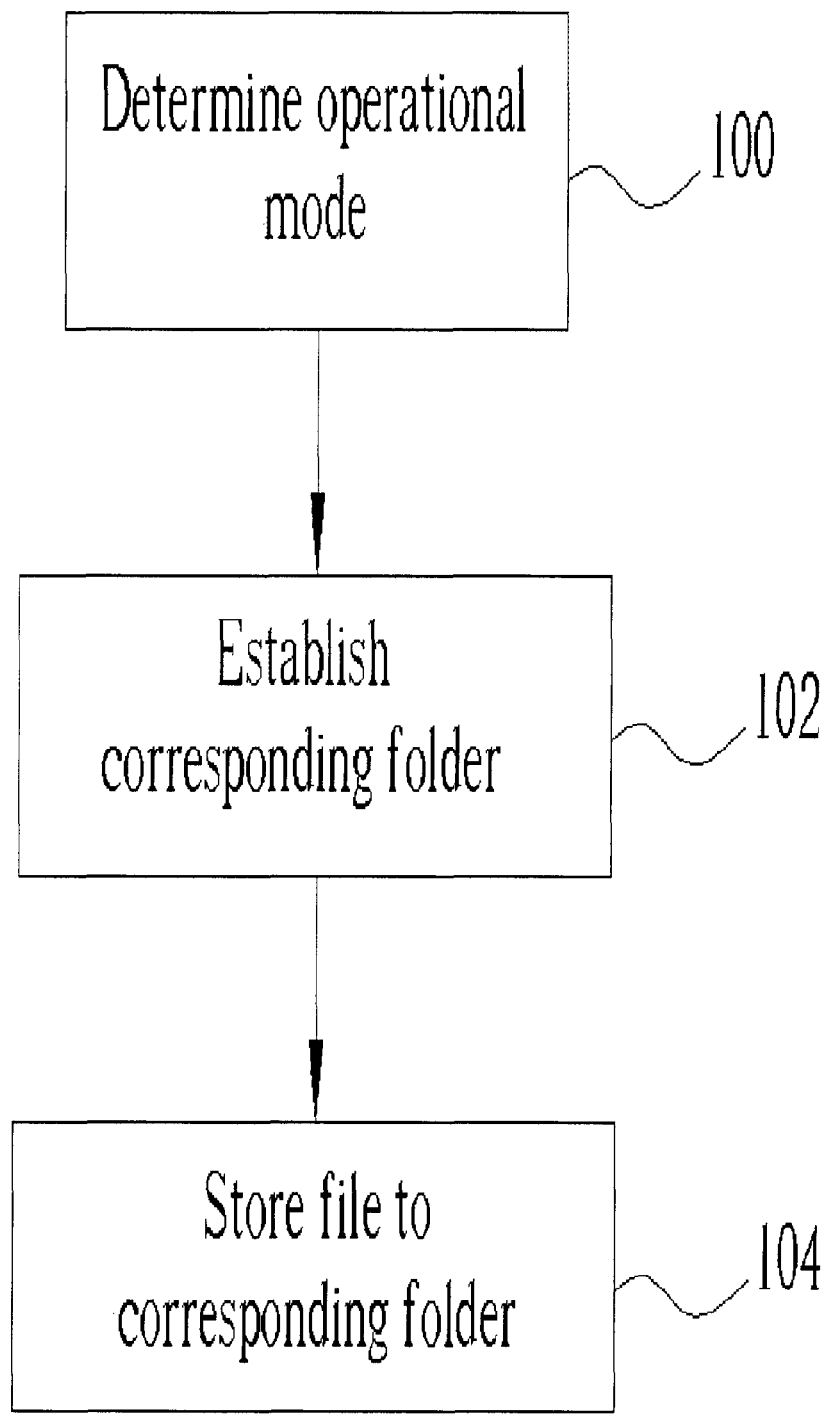
FIG. 7 is a flowchart of the file managing method for the image capturing apparatus according to the first embodiment of the present invention.

Please refer to FIG. 7 showing a flowchart of the file managing method for the image capturing apparatus 30 according to the first embodiment of the present invention. The flowchart contains the following steps:

Step 100: Press the operational mode button 42 to select the operational mode of the image capturing apparatus 30.

Step 102: Establish a folder in the memory 48 of the image capturing apparatus 30 according to a file type corresponding to the operational mode selected in Step 100.

Step 104: Store files captured by the image capturing apparatus 30 to the folder established in Step 102 according to the file type.

Figure 8:
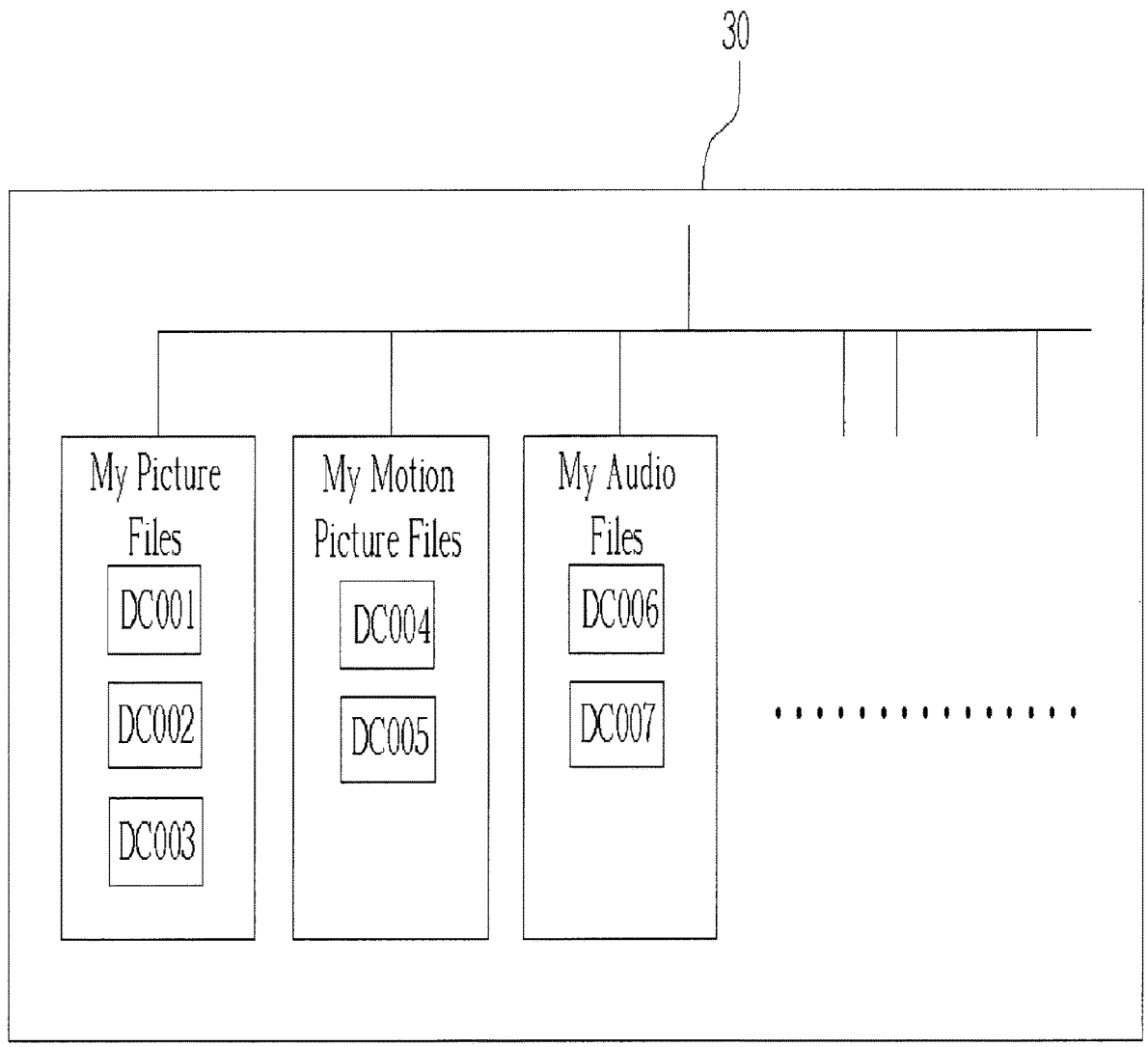
FIG. 8 illustrates the folders stored in the memory of the image capturing apparatus corresponding to different operational modes.

More specifically, the user can determine the operational mode by pressing the operational mode button 42. The operational mode can be typical picture mode, motion picture mode, or recording mode. When the user determines the operational mode by pressing the operational mode button 42, the folder-establishing module 47 of the control unit 46 automatically establishes a folder in the memory 48 of the image capturing apparatus 30 according to a file type corresponding to the operational mode selected in Step 100. For example, if the user selects typical picture mode by pressing the operational mode button 42, the folder-establishing module 47 automatically establishes a folder for image files (such as JPG, GIF, BMP etc.) in the memory 48 of the image capturing apparatus 30. If the user selects motion picture mode, the folder-establishing module 47 automatically establishes a folder for motion picture files (such as AVI, MPG etc.) in the memory 48 of the image capturing apparatus 30. And if the user selects recording mode, the folder-establishing module 47 automatically establishes a folder for audio files (such as WAV, MP3 etc.) in the memory 48 of the image capturing apparatus 30. Please refer to FIG. 8 showing the folders stored in the memory 48 of the image capturing apparatus 30 corresponding to the different operational modes. Assume that the folder-establishing module 47 establishes a "My Picture Files" folder for typical picture mode, a "My Motion Picture Files" folder for motion picture mode, and a "My Audio Files" folder for recording mode in the memory 48 of the image capturing apparatus 30. It is then able to store files to these corresponding folders. For example, DC001-DC003 are image files, DC004-DC005 are motion picture files, and DC007-DC008 are audio files.

The files generated by the image capturing apparatus 30 can be image files in typical picture mode, motion picture files in motion picture mode, or audio files in recording mode, and these files are automatically classified and stored in folders corresponding to their file types by comparing file name extensions with the folder name. The image capturing apparatus 30 can also receive files from other apparatuses through the transmitting module 50. For example, if an image file (e.g. with a file name extension of JPG, GIF, BMP etc.) is received from a computer, the image capturing apparatus 30 automatically saves the file to the "My Picture Files" folder. In the case of a motion picture file (e.g. with a file name extension of AVI, MPG etc.), the image capturing apparatus 30 automatically saves it to the "My Motion Picture Files" folder. The folder name can be replaced by other names convenient for the user to classify files. If corresponding folders are not already established in the memory 48 when the image capturing apparatus 30 receives files, the control module will automatically establish the corresponding folders in the memory 48 when the image capturing apparatus 30 receives files, and will automatically classify and store the files to the corresponding folders.

When the user opens a file in a specific folder, the control unit 46 uses corresponding applications to open the file in the memory 48 in the corresponding folder. For example, if the user wants to open DC001 in FIG. 8, the control unit 46 utilizes image browsing or editing applications to open DC001 according to the folder "My Picture Files". In the case of DC004, the control unit 46 utilizes image browsing or editing applications to open DC004 according to the folder "My Motion Picture Files". And in the case of DC007, the control unit 46 utilizes sound playing applications to open DC007 according to the folder "My Audio Files".

A shortcut can also be set up by the hot key 40 of the image capturing apparatus 30. When the shortcut is executed, files in a specific folder will be transmitted to another digital apparatus. For example, a shortcut can be setup by the hot key 40 such that when the hot key 40 is pressed, all the image files in the "My Picture Files" folder will be transmitted to another digital apparatus such as a computer connected to the image capturing apparatus 30. The files are transmitted by the transmitting module 50 using either a wired protocol such as USB or IEEE1394, or a wireless protocol such as infrared or bluetooth™.

Figure 9:
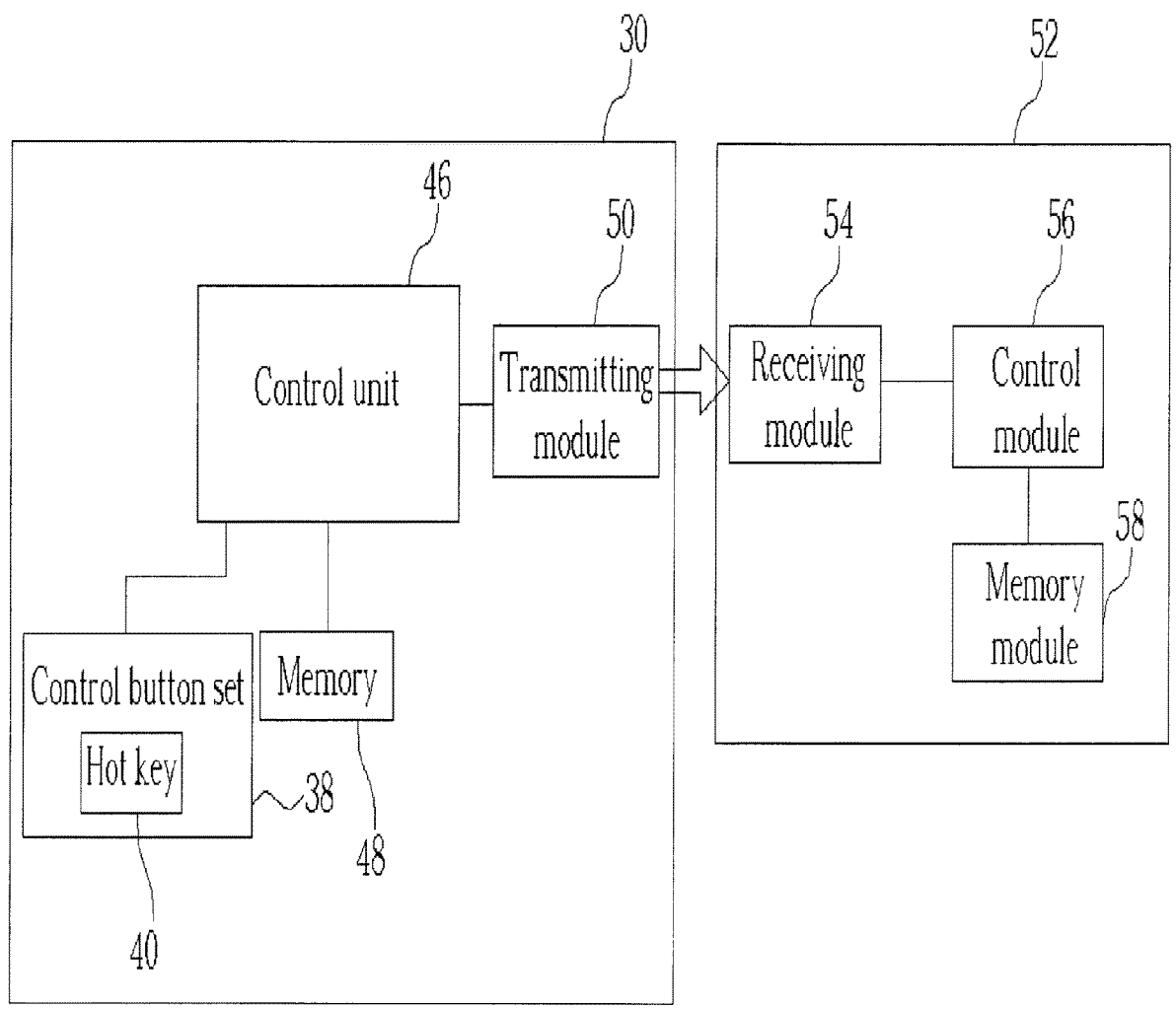
FIG. 9 illustrates a block diagram of the image capturing apparatus transmitting files to a computer according to the second embodiment of the present invention.
Figure 10:
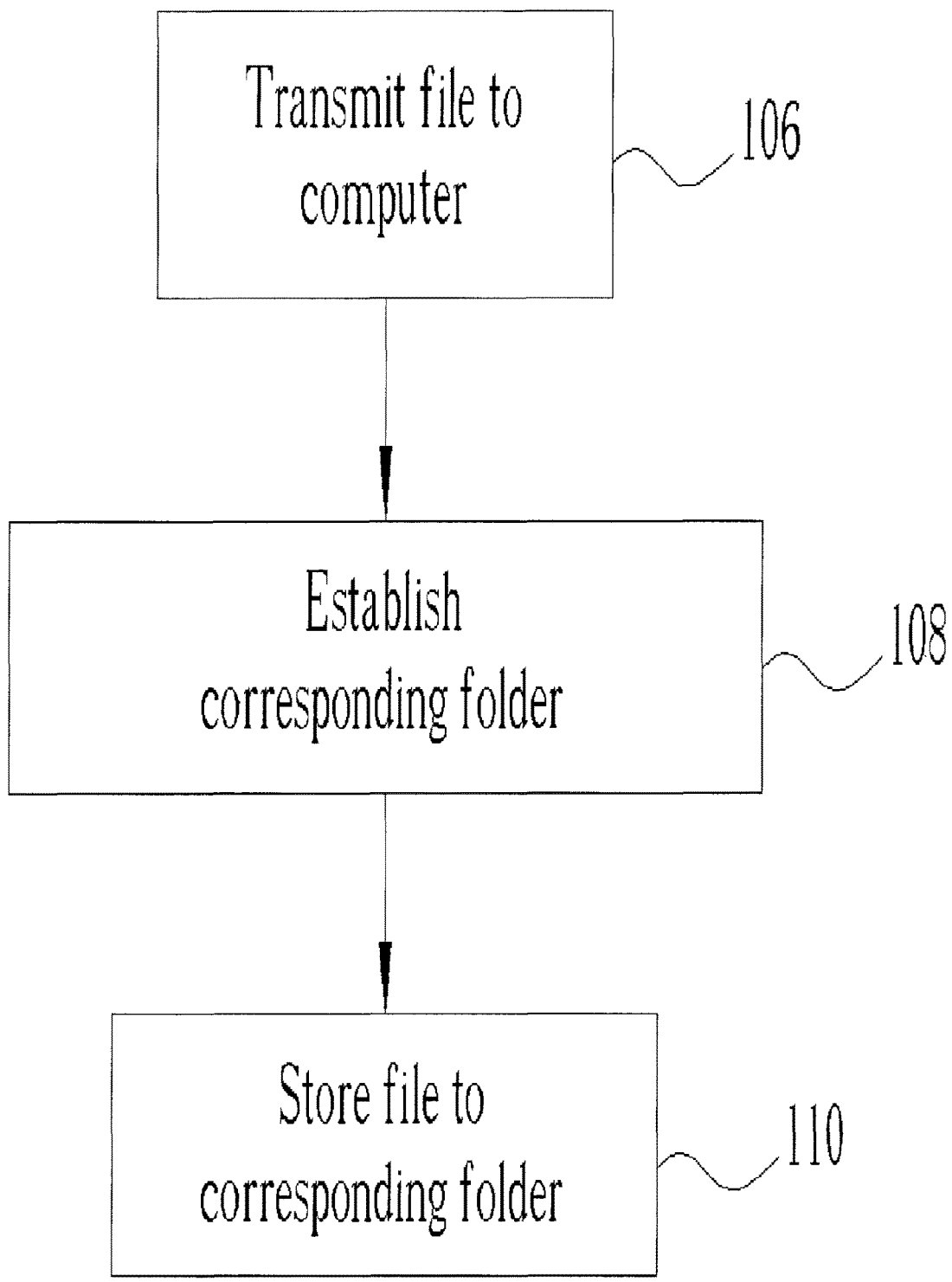
FIG. 10 is a flowchart of the file managing method for the image capturing apparatus connected to the computer according to the second embodiment of the present invention.

Please refer to FIG. 9 showing a block diagram of the image capturing apparatus 30 transmitting files to a computer 52 according to the second embodiment of the present invention. The computer 52 includes a receiving module 54 for receiving data from the transmitting module 50 of the image capturing apparatus 30, a control module 56 for controlling the operation of the computer 52, and a memory module 58 for storing the data. Please refer to FIG. 10 showing a flowchart of the file managing method for the image capturing apparatus 30 connected to the computer 52 according to the second embodiment of the present invention. The flowchart includes the following steps:

Step 106: Press the hot key 40 of the control button set 38 to transmit files in the folder corresponding to the short-cut stored in the memory 48 of the image capturing apparatus 30 to the computer 52 through the transmitting module 50.

Step 108: After the computer 52 receives the files from the transmitting module 50 using the receiving module 54, the control module 56 automatically establishes a folder in the memory module 50 according to the type of the files transmitted in Step 106.

Step 104: Store the files received by the receiving module 54 to the folder established in Step 108.

For example, if the image capturing apparatus 30 transmits an image file (e.g. with a file name extension of JPG, GIF, BMP etc.) to the computer 52, the computer 52 receives the file through its receiving module 54. The control module 56 automatically establishes a folder corresponding to the image file, such as "My Picture Files" folder, in the memory module 58 and saves the file to the "My Picture Files" folder. And in the case of a motion picture file (e.g. with a file name extension of AVI, MPG etc.), the computer 52 receives the file through its receiving module 54, and the control module 56 automatically establishes a folder corresponding to the image file, such as "My Motion Picture Files" folder in the memory module 58. The file is saved to the "My Motion Picture Files" folder.

Because the computer 52 has a large memory capacity provided by a hard disk drive or an optical disk drive, it can provide other portable digital apparatuses, such as digital cameras, a means to store backup files. When the user connects the image capturing apparatus 30 to the computer 52, since the file managing systems of the image capturing apparatus 30 and the computer 52 are compatible, data exchange between the two devices is very convenient.

Figure 11:
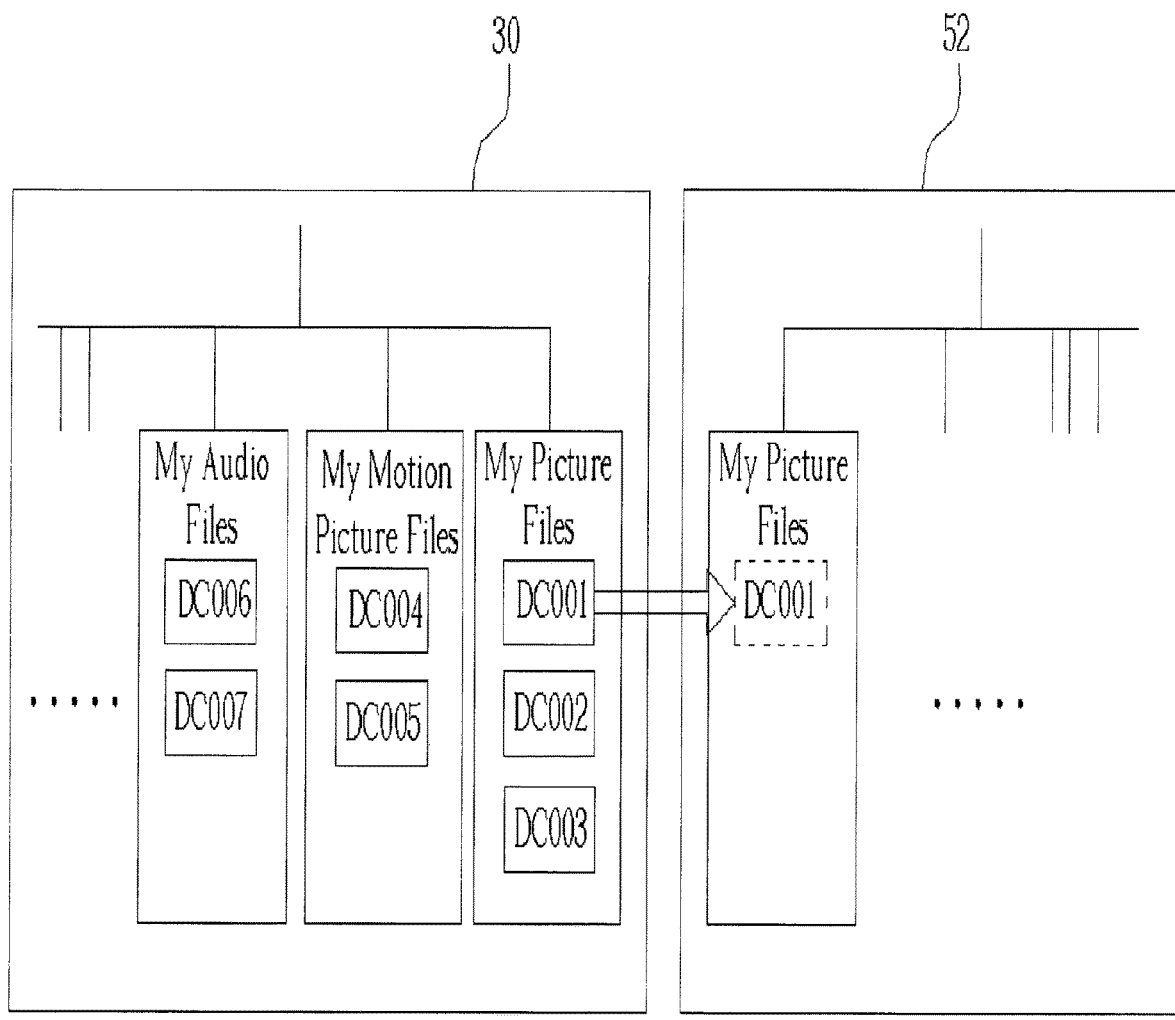
FIG. 11 illustrates the file managing method of the image capturing apparatus transmitting a file to the computer.

Please refer to FIG. 11 showing the file managing method of the image capturing apparatus 30 transmitting a file to the computer 52. If the user is going to transmit DC001 to the computer 52 for backup, DC001 will be automatically transmitted from the "My Picture Files" folder in the memory 48 of the image capturing apparatus 30 to the "My Picture Files" folder in the memory module 58 of the computer 52. In other words, the transmitting end will transmit files automatically to corresponding folders of the receiving end, in order to classify the files according to their types. Similarly, if the user is going to transmit a file from the computer 52 to the image capturing apparatus 30, the file will be automatically transmitted from the "My Picture Files" folder in the memory module 58 of the computer 52 to the "My Picture Files" folder in the memory 48 of the image capturing apparatus 30.

Besides the image capturing apparatus 30, other digital apparatuses applying the method disclosed by the present invention can also be used including portable digital apparatuses such as digital cameras, mobile phones, and digital camcorders. The present invention also provides file managing and transmitting method between these digital apparatuses.

In contrast to the prior art, the present invention provides a file managing method which establishes folders according to different file type of different operational modes and store files according to the file type into the different folders. In such a manner, files are stored in corresponding folders, so that the files are well classified instead of needing to be classified one by one as in the prior art. Moreover, according to the present invention, a user can exchange data simply using a hot key between different portable digital apparatuses with the same file managing system, so that the barriers due to incompatibility are solved. In addition, according to the present invention, a computer providing a larger storage capacity than the other portable digital apparatuses, such as a digital camera, provides the best means to store backup files. And since the file managing systems of the image capturing apparatus 30 and the computer 52 according to the present invention are compatible, data can be smoothly exchanged between the two devices so that they can be well classified and managed.

Those skilled in the art will readily observe that numerous modifications and alterations of the method may be made while retaining the teachings of the invention. Accordingly, the above disclosure should be construed as limited only by the metes and bounds of the appended claims.

What is claimed is:

1. A method for managing and accessing digital files on a digital apparatus having image capturing capabilities, image storage capabilities, and multiple operational modes, the method comprising:

determining a selected first operational mode of the digital apparatus, wherein the selected first operational mode is selected from the multiple operational modes;

capturing first information in the selected first operational mode and storing the first information in a first file on the digital apparatus, wherein capturing the first information in the first operational mode comprises converting optical signals received at a lens of the digital apparatus to electrical signals;

in response to the capturing and based on the selected first operational mode, establishing a first folder in a memory of the digital apparatus, the first folder having a folder type determined according to the first selected operational mode;

storing the first file in the first folder;
determining a selected second operational mode of the digital apparatus, wherein the selected second operational mode is selected from the multiple operational modes and is distinct from the selected first operational mode;
capturing second information in the selected second operational mode and storing the second information in a second file on the digital apparatus, wherein capturing the second information in the second operational mode comprises converting audio signals received at a recording module of the digital apparatus to electrical signals;
in response to the capturing and based on the selected second operational mode, establishing a second folder in a memory of the digital apparatus, the second folder having a folder type determined according to the second selected operational mode; and
storing the second file in the second folder.

2. The method of claim 1, further comprising establishing a first hot key shortcut for the apparatus in response to compression of a button on the digital apparatus, and wherein transmitting each file from only the first folder on the digital apparatus to another digital apparatus via a wireless transmission protocol directly in response to the compression of the button based on the first hot key shortcut.

3. The method of claim 2 wherein the digital apparatus is a first digital apparatus, and wherein the method further comprises causing a second digital apparatus to establish a corresponding folder based, at least in part, on a type of one or more files contained by the first folder.

4. The method of claim 3 wherein the type of one or more files contained by the first folder corresponds to at least one of image, motion picture, or audio type.

5. The method of claim 3 wherein executing the first hot key shortcut functions as a command to transmit files from only the first folder to the corresponding folder of the second digital apparatus.

6. The method of claim 3 wherein the second digital apparatus comprises a personal computer.

7. The method of claim 1 wherein the digital apparatus is a first digital apparatus, and wherein the method further comprises establishing a hot key shortcut for the first digital apparatus in response to compression of a button on the digital apparatus, and wherein executing the hot key shortcut functions as a command to transmit each file from only the second folder to a second digital apparatus directly in response to the compression of the button.

8. The method of claim 1 wherein the multiple operational modes include at least one of a picture mode, motion picture mode, or recording mode.

9. The method of claim 1 wherein the digital apparatus includes at least one of a digital camera, digital camcorder, or mobile phone.

10. A memory device storing instructions that, when executed by one or more processors of a computing device, cause the computing device to perform actions comprising:
determining a selected first operational mode of the computing device, wherein the selected first operational mode is selected from multiple operational modes;
capturing first information in the selected first operational mode and storing the first information in a first file on the computing device, wherein capturing the first information in the first operational mode comprises converting optical information received at the computing device to digital image files;
in response to the capturing and based, at least in part, on the selected first operational mode, establishing a first folder in the memory device, the first folder having a folder type determined according to the first selected operational mode;
storing the first file in the first folder;
determining a selected second operational mode of the computing device, wherein the selected second operational mode is selected from the multiple operational modes and is distinct from the selected first operational mode;
capturing second information in the selected second operational mode and storing the second information in a second file on the computing device, wherein capturing the second information in the second operational mode comprises converting audio information received at the computing device to digital audio files;
in response to the capturing and based, at least in part, on the selected second operational mode, establishing a second folder in the memory device, the second folder having a folder type determined according to the second selected operational mode; and
storing the second file in the second folder.

11. The memory device of claim 10 wherein the computing device is a first computing device, and wherein the actions further comprise establishing a hot key shortcut for the first computing device linked to a hot key button on the first computing device, and the actions further comprise transmitting files from only the second folder to a second computing device directly in response to compression of the hot key button on the first computing device.

12. The memory device of claim 11 wherein the actions further comprise receiving one or more files from the second computing device.

13. The memory device of claim 12 wherein the actions further comprise classifying the received one or more files based, at least in part, on a file type of the received one or more files.

14. The memory device of claim 13 wherein classifying the received one or more files comprises comparing at least one file name extension of the received one or more files with at least one folder type of the folders established in the memory device.

15. A digital apparatus comprising:
one or more image sensing modules;
one or more audio recording modules;
one or more processors; and
memory storing contents that, when executed by the one or more processors, cause the digital apparatus to:
capture first information in a selected first operational mode and store the first information in a first file, wherein capturing the first information in the first operational mode comprises converting optical signals received at the one or more image sensing modules;
in response to the capturing and based, at least in part, on the selected first operational mode, establish a first folder in the memory, the first folder having a folder type determined according to the first selected operational mode;
store the first file in the first folder;
capture second information in a selected second operational mode distinct from the first operational mode and store the second information in a second file, wherein capturing the second information in the second operational mode comprises converting audio signals received at the one or more audio recording modules;

in response to the capturing and based, at least in part, on the selected second operational mode, establish a second folder in the memory, the second folder having a folder type determined according to the second selected operational mode; and store the second file in the second folder.

16. The digital apparatus of claim 15, further comprising a hot key button, wherein the contents further cause the digital apparatus to transmit a plurality of files from only one of the first folder or second folder to a different digital apparatus directly in response to a compression of the hot key button.

17. The digital apparatus of claim 16 wherein transmitting the files is performed using a wireless network transmission.

18. The digital apparatus of claim 16 wherein the contents further cause, prior to or during transmission of the files from the only one of the first folder or second folder to the another digital apparatus, establishing of a corresponding folder on the another digital apparatus in accordance with a type of files contained by the only one of the first folder or second folder.

19. The digital apparatus of claim 18 wherein the type of the files contained by the only one of the first folder or second folder includes at least one of image, motion picture, or audio type.

20. The digital apparatus of claim 16 wherein the contents further cause the digital apparatus to receive one or more files from the different digital apparatus.

* * * * *